US008761231B2

(12) United States Patent
Park et al.

(10) Patent No.: US 8,761,231 B2
(45) Date of Patent: Jun. 24, 2014

(54) FREQUENCY MODULATING APPARATUS AND TRANSMITTING APPARATUS INCLUDING THE SAME, AND FREQUENCY DEMODULATING APPARATUS AND RECEIVING APPARATUS INCLUDING THE SAME

(75) Inventors: Hyung Il Park, Daejeon (KR); In Gi Lim, Daejeon (KR); Tae Wook Kang, Daejeon (KR); Sung Weon Kang, Daejeon (KR); Kyung Soo Kim, Daejeon (KR); Jung Bum Kim, Daejeon (KR); Chang Hee Hyoung, Daejeon (KR); Jung Hwan Hwang, Daejeon (KR); Jin Kyung Kim, Daejeon (KR); Sung Eun Kim, Seoul (KR); Duck Gun Park, Daejeon (KR); Ki Hyuk Park, Daejeon (KR); Jae Hoon Shim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 602 days.

(21) Appl. No.: 12/667,385

(22) PCT Filed: Apr. 29, 2008

(86) PCT No.: PCT/KR2008/002430
§ 371 (c)(1),
(2), (4) Date: Dec. 30, 2009

(87) PCT Pub. No.: WO2009/005217
PCT Pub. Date: Jan. 8, 2009

(65) Prior Publication Data
US 2011/0007844 A1 Jan. 13, 2011

(30) Foreign Application Priority Data

Jul. 3, 2007 (KR) .................. 10-2007-0066672
Aug. 29, 2007 (KR) .................. 10-2007-0087260

(51) Int. Cl.
*H04B 1/00* (2006.01)
(52) U.S. Cl.
USPC ........... 375/146; 375/141; 375/147; 375/219; 375/340; 375/346; 370/441

(58) Field of Classification Search
CPC ......... H04J 13/16; H04J 13/18; H04J 11/003; H04J 13/0003
USPC ......... 375/219, 295, 316, 302, 141, 146, 147, 375/340, 346; 332/117; 329/315; 370/441
See application file for complete search history.

(56) References Cited

U.S. PATENT DOCUMENTS

| 5,528,581 | A | 6/1996 | De Bot |
| 6,980,539 | B2 * | 12/2005 | Hanada et al. ............... 370/342 |
| 6,987,747 | B1 | 1/2006 | Mottier et al. |
| 7,263,084 | B2 * | 8/2007 | Miyoshi ...................... 370/335 |

(Continued)

FOREIGN PATENT DOCUMENTS

| CN | 1856945 A | 11/2006 |
| EP | 1 420 531 A1 | 5/2004 |

(Continued)

OTHER PUBLICATIONS

T.G. Zimmerman, "Personal Area Networks: Near-field intrabody communication", IBM System Journal, 1996, pp. 609-617, vol. 35, Nos. 3&4.

(Continued)

*Primary Examiner* — Sophia Vlahos

(57) ABSTRACT

Provided are a frequency modulation/demodulation apparatus using a frequency selective baseband and a transmitting/receiving apparatus using the same. In a frequency selective baseband transmission technique or an FS-CDMA technique, a transmission rate is controlled according to communication channel environment, spread code groups are repeatedly selected in a receiving side so as to obtain a frequency diversity gain. Accordingly, it is possible to reduce interference between users. In addition, even in a case where strong interference induced from electronic exists, it is possible to implement low-power, stable human-body communication and to ensure a communication quality.

17 Claims, 5 Drawing Sheets

(56) References Cited

U.S. PATENT DOCUMENTS

| | | | |
|---|---|---|---|
| 2004/0066838 A1 | 4/2004 | Choi et al. | |
| 2004/0114549 A1 | 6/2004 | Miyoshi | |
| 2004/0165675 A1* | 8/2004 | Ito et al. | 375/267 |
| 2004/0170121 A1* | 9/2004 | Kim et al. | 370/208 |
| 2004/0196780 A1* | 10/2004 | Chin et al. | 370/208 |
| 2004/0202146 A1 | 10/2004 | Lee | |
| 2005/0002368 A1 | 1/2005 | Kwon et al. | |
| 2005/0111348 A1 | 5/2005 | Mottier et al. | |
| 2006/0280273 A1 | 12/2006 | Mueller-Weinfurtner | |
| 2007/0183482 A1* | 8/2007 | Fujita et al. | 375/141 |
| 2010/0171562 A1 | 7/2010 | Lim et al. | |

FOREIGN PATENT DOCUMENTS

| | | |
|---|---|---|
| JP | 10-065575 A | 3/1998 |
| JP | 11-234188 A | 8/1999 |
| JP | 2001-211144 A | 8/2001 |
| JP | 2003-224545 A | 8/2003 |
| JP | 2010-531606 A | 9/2010 |
| KR | 100273130 B1 | 1/2000 |
| WO | WO 03/032511 A1 | 4/2003 |
| WO | WO 2004/038986 A2 | 5/2004 |
| WO | WO 2008/060045 A1 | 5/2008 |

OTHER PUBLICATIONS

International Search Report for PCT/KR2008/002430 filed on Apr. 29, 2008.

Written Opinion of the International Searching Authority for PCT/KR2008/002430 filed on Apr. 29, 2008.

* cited by examiner

Fig. 3

SUB-GROUP 0 (W₀~W₁₅)

| | |
|---|---|
| W0 | 0000000000000000000000000000000000000000000000000000000000000000 |
| W1 | 0000000000000000000000000000000011111111111111111111111111111111 |
| W2 | 0000000000000000111111111111111111111111111111110000000000000000 |
| W3 | 0000000000000000111111111111111110000000000000001111111111111111 |
| W4 | 0000000011111111111111110000000000000000111111111111111100000000 |
| W5 | 0000000011111111111111110000000011111111000000000000000011111111 |
| W6 | 0000000011111111000000001111111111111111000000001111111100000000 |
| W7 | 0000000011111111000000001111111110000000111111110000000011111111 |
| W8 | 0000111111110000000011111111000000001111111110000000111111110000 |
| W9 | 0000111111110000000011111111000011110000000011111111000000001111 |
| W10 | 0000111111110000111100000000111111110000000011110000111111110000 |
| W11 | 0000111111110000111100000000111100001111111100001111000000001111 |
| W12 | 0000111000011111111000011110000000001111000111111111000011110000 |
| W13 | 0000111000011111111000011110000111100001111000000001111000011111 |
| W14 | 0000111000011110000111000111111110000111110000111110000011110000 |
| W15 | 0000111100001111000011110000111100001111000011110000111100001111 |

SUB-GROUP 1 (W₁₆~W₃₁)

| | |
|---|---|
| W16 | 0011110000111100001111000011110000111100001111000011110000111100 |
| W17 | 0011110000111100001111000011001100001111000011110000111100000011 |
| W18 | 0011110000111100110000111100001111000011110000110011110000111100 |
| W19 | 0011110000111100110000111100001100111100001111001100001111000011 |
| W20 | 0011110011000011110000110011110000111100110000110011000011001100 |
| W21 | 0011110011000011110000110011110011000011001111000011110011000011 |
| W22 | 0011110011000011001111001100001111000011001111001100001100111100 |
| W23 | 0011110011000011001111001100001100111100110000110011110011000011 |
| W24 | 0011001111001100001100111100110000110011111100001100111100110011 |
| W25 | 0011001111001100001100111100110011000011001111001100110000110011 |
| W26 | 0011001111001100110011000011001111001100001100110011001111001100 |
| W27 | 0011001111001100110011000011001100110011111100110011001100110011 |
| W28 | 0011001100110011110011001100110000110011001100111100110011001100 |
| W29 | 0011001100110011110011001100110011001100110011001100110011001100 |
| W30 | 0011001100110011001100110011001111001100110011001100110011001100 |
| W31 | 0011001100110011001100110011001100110011001100110011001100110011 |

SUB-GROUP 2 (W₃₂~W₄₇)

| | |
|---|---|
| W32 | 0110011001100110011001100110011001100110011001100110011001100110 |
| W33 | 0110011001100110011001100110110011001100110011001100110011001001 |
| W34 | 0110011001101001100110011001100110011001100101100110011001100110 |
| W35 | 0110011001101001100110011001100101100110011001101001100110011001 |
| W36 | 0110010011001100100101100110011001101001001100110011001001100110 |
| W37 | 0110010011001100100101100110011001101001001100110011001001100110 |
| W38 | 0110010011001100110110011001100110011001001100110100110011001001 |
| W39 | 0110010011001001100110011001101011001100110011001100110110010110 |
| W40 | 0110100110010110010110010010110011010010011001010010110011010110 |
| W41 | 0110100110010110010110010010110010011001010010110010110010011001 |
| W42 | 0110100110010110010110010010110010011001010010110010110010011001 |
| W43 | 0110100110010110010110010010110010011001010010110010110010011001 |
| W44 | 0110100101101001100101101001011010010010110100101010010100110110 |
| W45 | 0110100101101001100101101001011010010010110100101010010100110101 |
| W46 | 0110100101101001100101101001011010010010110100101010010100110110 |
| W47 | 0110100101101001100101101001011010010010110100101010010100110101 |

SUB-GROUP 3 (W₄₈~W₆₃)

| | |
|---|---|
| W48 | 0101101001011010010110100101101001011010010110100101101001011010 |
| W49 | 0101101001011010010110100101101010010110100101101001011010010101 |
| W50 | 0101101001011010010110100101101010101001011010010110100101011010 |
| W51 | 0101101001011010010110100101011010010101101001011010101010010101 |
| W52 | 0101101010010101101001010110101010010101010110100101010101010101 |
| W53 | 0101101010010101101001010110101010010101010110100101010101010101 |
| W54 | 0101101010010101101010010101010101010101010110100101010101010101 |
| W55 | 0101101010010101010101010101010101010101010101010101010101010101 |
| W56 | 0101010110101010010101101010100101010101010101010101010101010101 |
| W57 | 0101010110101010010101010101010101010101010101010101010101010101 |
| W58 | 0101010110101010101010100101010101010101010101010101010101010101 |
| W59 | 0101010110101010101010100101010101010101010101010101010101010101 |
| W60 | 0101010101010101101010101010101010101010101010101010101010101010 |
| W61 | 0101010101010101010101010101010101010101010101010101010101010101 |
| W62 | 0101010101010101010101010101010101010101010101010101010101010101 |
| W63 | 0101010101010101010101010101010101010101010101010101010101010101 |

Fig. 4

| | | ERROR-OCCURRING BIT | | |
|---|---|---|---|---|
| GROUP-3 | 0 1 1 0 | 1 | 1 1 0 0 | 1 | 1 0 0 1 1 0 0 1 | 1 | 0 ... |
| GROUP-2 | 0 1 1 0 | 0 | 1 1 0 0 | 0 | 1 0 0 1 1 0 0 1 | 1 | 0 ... |
| GROUP-1 | 0 1 1 0 | 0 | 1 1 0 0 | 1 | 1 0 0 1 1 0 0 1 | 0 | 0 ... |
| RESULT OF COMBINING | 0 1 1 0 | 0 | 1 1 0 0 | 1 | 1 0 0 1 1 0 0 1 | 1 | 0 ... |

FREQUENCY MODULATING APPARATUS AND TRANSMITTING APPARATUS INCLUDING THE SAME, AND FREQUENCY DEMODULATING APPARATUS AND RECEIVING APPARATUS INCLUDING THE SAME

TECHNICAL FIELD

The present invention relates to a communication scheme using a frequency selective baseband, and more particularly, to a communication apparatus using a human body as a communication channel in a frequency selective baseband transmission technique or an FS-CDMA technique by controlling a transmission rate according to communication channel environment and repeatedly selecting and transmitting spread code groups and obtaining a frequency diversity gain in a receiving side, thereby ensuring a communication quality.

The work related to the present invention was supported by the IT R&D program of MIC/IITA [2006-S-072-02, Human-body Communication Controller SoC].

BACKGROUND ART

Human-body communication is a technique for transmitting signals between apparatus connected to a human body by using the human body having conductivity as a communication channel. In the human-body communication technique, a communication network to various portable apparatuses such as personal digital assistants (PDAs), portable personal computers, digital cameras, MP3 players, and mobile phones or a communication network to fixed-type apparatuses such as printers, TVs, and entrance systems can be implemented by a user simply contacting the apparatuses.

In a conventional human-body communication technique, low-rate data communication having a maximum transmission rate of tens Kbps can be implemented by using a digital modulation scheme such a frequency shift keying (FSK) modulation scheme or an amplitude shift keying (ASK) modulation scheme and a specific frequency. In addition, applications thereof are limited to simple applications requiring only the data transmission.

A human body is constructed with various materials and shapes and has a low conductivity and a high dielectric constant. Therefore, the human body has a function as an antenna in a wide frequency band. Due to the characteristics of the human body, signals of other users near to the human body or noise signals originated from external electronic apparatuses may be induced into the human body. In addition, the communication may be unstable according to positions of neighboring objects and electronic apparatuses and distances among them.

In the frequency modulating scheme such as FSK, ASK, and PSK modulation schemes, a frequency band having less external interference can be selected and used, and a relatively low signal-to-noise ratio is required for implementation of communication. However, if interference occurs due to the characteristics of human body, it is difficult to avoid the interference.

In addition, in a direct transmission scheme of digital signals such as the human-body communication scheme, a very wide frequency band is needed, and a receiving signal is mixed with strong interference induced from neighboring electronic apparatus as well as the transmitting signal transmitted from a transmitter. In case of occurrence of the interference in the signal band, even a receiver having a good sensitivity cannot easily extract desired signals.

In addition, in the direct signal transmission scheme, a frequency band of several tens MHz or more is needed to directly transmit the digital signals of several Mbps or more, and when such signals are applied to the human body, signals in the band to exceed a specific frequency are radiated outward body. Therefore, in a case where a plurality of users is located, even though there is no contact, signals of other users occur interferences, so that it is difficult to implement a stable communication network.

DISCLOSURE OF INVENTION

Technical Problem

A conventional human-body communication system has a problem in that the human-body communication system is sensitive to noise induced from noise sources in strong-noise environment such as an exhibition hall as well as weak-noise environment such as home or office. In order to solve the problems, a method of obtaining a gain by using a channel codec is used. However, the method has a problem of large area, large delay, and high power consumption.

In order to solve the problem, the present invention provides an apparatus capable of having low power consumption and overcoming errors caused from noises and channels by using a diversity gain obtained by repeatedly transmitting and receiving data through independent channels so as to remove interference between a plurality of users in the communication channel environment where the plurality of users are located and to implement stable communication under strong interference induced from other electronic apparatus.

Technical Solution

According to an aspect of the present invention, there is provided a frequency modulating apparatus for a frequency selective base band having a frequency diversity, comprising: a transmission rate controller controlling a data transmission rate and repetitive transmission time according to communication channel environment; a data generator repetitively outputting the same serial data corresponding to the repetitive transmission times under the control of the transmission rate controller; a serial-to-parallel converter converting the serial data output from the data generator to a parallel data; and a frequency selective spreader selecting a frequency selective spread code corresponding to the parallel data converted corresponding to the repetitive transmission times under the control of the transmission rate controller.

In the above aspect of the present invention, the frequency modulating apparatus may further comprise a scrambler which scrambles the serial data output from the data generator before the conversion of the serial data to the parallel data.

The transmission rate controller may control the frequency selective spreader to select one of a plurality of spread code groups obtained by dividing $2^N$ (N is 0 or an natural number) spread codes used for frequency spreading by $2^M$ (M<N, M is 0 or an natural number) spread codes by using (N−M) frequency selective control bits.

The transmission rate controller may control the frequency selective spreader to respectively perform the selecting of one of the plurality of spread code groups by the repetitive transmission times.

The frequency selective spreader may be inputted with M-bit parallel data and N-bit input data used for selecting the frequency selective spread codes for frequency spreading and (N−M) frequency selective control bits used for selecting the one spread code group.

The frequency selective spreader, under the control of the transmission rate controller, may select and output different spread code groups with respect to the same serial data outputted corresponding to the repetitive transmission times and select and output one of the $2^M$ spread codes of each spread code group.

The frequency selective spreader may comprise: an N-bit counter outputting an N-bit input data; (N−1) first XOR arithmetic operators performing a gray indexing operation on (N−M) bit frequency selection control bits and M bits data input bits; N AND arithmetic operators performing a logic AND arithmetic operation on an output of the N-bit counter, the (N−M) bit frequency selection control bits, and output bits of the (N−1) first XOR arithmetic operators; and the second XOR arithmetic operator performing a XOR arithmetic operation on outputs of the N AND arithmetic operators.

According to another aspect of the present invention, there is provided a frequency demodulating apparatus for a frequency selective baseband having a frequency diversity, comprising: a signal combining controller controlling combining transmission data repetitively transmitted from a transmitting side corresponding to repetitive transmission times according to communication channel environment; a frequency selective de-spreader, under the control of the signal combining controller, detecting frequency selective spread code selected from the transmission data by the transmitting side corresponding to the repetitive transmission times and output respective M-bit parallel data; a parallel-to-serial converter converting the M-bit parallel data outputted from the frequency selective de-spreader to serial data; and a data processor, under the control of the signal combining controller, being inputted with the serial data corresponding to the repetitive transmission times to recover error-occurring bits, thereby performing combining.

In the above aspect of the present invention, the frequency demodulating apparatus may further comprise a de-scrambler which de-scrambles the converted serial data before the recovering of the error-occurring bits.

The frequency selective de-spreader may obtain one of a plurality of spread code groups obtained by dividing $2^N$ spread codes used for frequency spreading by $2^M$ (M<N) spread codes and one spread code selected from $2^M$ spread codes constituting one spread code group from the transmission data, and output an index value corresponding to the selected one spread code as an M-bit parallel data.

The selected one spread code may be a spread code corresponding to the highest correlation value obtained by comparing all the correlation values of the $2^M$ spread codes.

The data processor, under the control of the signal combining controller, may obtain a diversity gain by correcting error-occurring bits with respect to the same serial data inputted corresponding to the repetitive transmission times by using an equal gain combining scheme or a maximum ratio combining scheme in which weighting factors are allocated according to communication channel characteristics.

According to another aspect of the present invention, there is provided a transmitting apparatus for a frequency selective baseband having a frequency diversity, comprising: a preamble/header generating unit generating a preamble for frame synchronization and a header having control information for a to-be-transmitted data and repetitive transmission times for repeatedly transmitting the same data; a frequency modulating unit selecting spread code groups to be used corresponding to the repetitive transmission times according to communication channel environment among a plurality of spread code groups obtained by dividing $2^N$ spread codes used for frequency spreading by $2^M$ (M<N) spread codes and selecting one spread code among the $2^M$ spread codes of each selected spread code group; and a multiplexing unit multiplexing the preamble, the header, and the spread codes selected corresponding to the repetitive transmission times into a digital signal.

In the above aspect of the present invention, the preamble/header generating unit may comprise: a header generator generating a header in a predetermined header format by using the control information of the to-be-transmitted data; a header processor having a spreader for spreading the header; and a preamble generator generating a predetermined length of preamble by using an initial value set in order to acquire the frame synchronization.

The frequency modulating unit may comprise: a transmission rate controller adjusting a transmission rate of the to-be-transmitted data and the repetitive transmission times according to the communication channel environment and controlling repeatedly transmitting the same data corresponding to the repetitive transmission times; a data generator repeatedly outputting the same serial data corresponding to the repetitive transmission times under the control of the transmission rate controller; a serial-to-parallel converter converting the serial data outputted from the data generator to an M-bit parallel data; and a frequency selective spreader generating a plurality of spread code groups obtained by dividing $2^N$ spread codes used for frequency spreading by $2^M$ (M<N) spread codes, selecting one spread groups among the plurality of spread code groups corresponding to the repetitive transmission times by receiving (N−M) frequency selective control bits, and selecting one spread code among $2^M$ spread codes of each selected spread code groups by receiving the M-bit parallel data.

The frequency modulating unit may further comprise a scrambler scrambling the serial data outputted from the data generator before the converting of the serial data to the M-bit parallel data.

According to another aspect of the present invention, there is provided a receiving apparatus for a frequency selective baseband having a frequency diversity, comprising: a frame synchronizer detecting a preamble of a transmitting data repeatedly transmitted corresponding to frequency selective spread code and acquiring a frame start time; a de-multiplexer separating header and data parts of the transmitting data by using the frame start time; a header processor de-spreading the separated header to recover control information of the data; a frequency demodulating unit selecting, among a plurality of spread code groups obtained by dividing $2^N$ spread codes by $2^M$ spread codes by using information of repetitive transmission times detected from the control information of the data, one spread code groups that are determined to be used for modulation of the transmitting data and detecting one spread code among the $2^M$ spread codes of each selected spread code group.

In the above aspect of the present invention, the receiving apparatus may further comprise an analog processor performing noise removing, clock recovering, and data retiming with respect to the input transmitting data before the detecting of the frame start time in the frame synchronizer.

The frequency demodulating unit may comprise: a signal combining controller controlling combining of the data transmitted corresponding to the repetitive transmission times; a frequency selective de-spreader detecting frequency selective spread codes selected in a transmitting side from the transmitting data corresponding to the repetitive transmission times under the control of the signal combining controller and outputting an M-bit parallel data; a parallel-to-serial converter converting the M-bit parallel data outputted from the frequency selective de-spreader to a serial data; and a data processor receiving the serial data corresponding to the repetitive transmission times under the control of the signal combining controller and recovering and combining error-occurring bits.

The frequency demodulating unit may further comprise a de-scrambler de-scrambling the converted serial data before the recovering of the error-occurring bits.

The control information of the data includes one or more among a transmission rate, a modulation scheme, a user ID, a data length, and repetitive transmission times of the data transmitted from the transmitting side.

Advantageous Effects

As described, according to the present invention, in a frequency modulation/de-modulation apparatus in the frequency selective baseband having the frequency diversity and a transmitting/receiving apparatus using the same, a frequency selective baseband transmission scheme having a frequency diversity gain can be adapted to a human-body communication system to repeatedly transmit and receive the same data in independent channels according to communication channel environment, so that it is possible to ensure stable communication even in case of occurrence of strong noise in a specific band.

BRIEF DESCRIPTION OF THE DRAWINGS

FIG. 3 is a view illustrating a configuration of a spread code group using 64-bit Walsh codes according to an embodiment of the present invention.

FIG. 4 is a view illustrating an example of a result of error recovery obtained by combining a receiving signal received by a receiver according to an embodiment of the present invention.

BEST MODE FOR CARRYING OUT THE INVENTION

Figure 1:
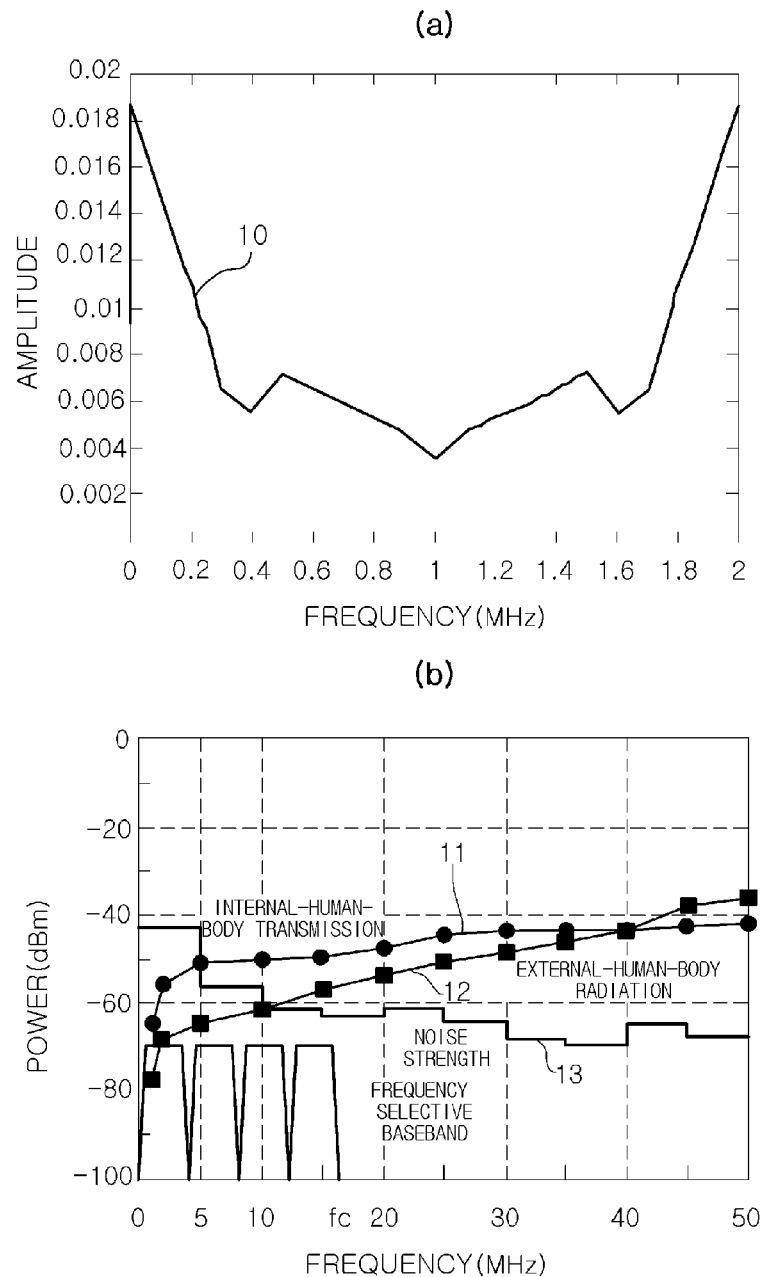
FIG. 1(a) is a graph illustrating frequency-varying amplitude response characteristics of a human body according to the present invention.
FIG. 1(b) is a graph illustrating a relationship among a frequency selective baseband, a frequency-varying internal-human-body transmission signal power, and an external-human-body noise power for human-body communication.

Hereinafter, embodiments of the present invention will be described in detail with reference to the accompanying drawings so that the ordinarily skilled in the art can easily implement the embodiments.

However, in the detailed description of operational principles of the embodiments of the present invention, detailed description of well-known construction and operations will be omitted for clarifying the present invention.

In addition, in the drawings, elements having similar functions and operations are denoted by the same reference numerals.

In the specification, "connection between an element and another element" includes "indirect connection through still another element therebetween" as well as "direct connection therebetween".

In addition, "comprising an element" denotes not excluding other elements but further comprising other elements if there is no specific contrary description.

Before the description of the present invention, terminologies and concepts thereof associated with the present invention are described as follows.

In the present invention, a transmission scheme denotes frequency selective baseband transmission scheme that can obtain a desired frequency band and a processing gain during baseband transmission with the very simple analog transceiver by only "the spread codes having the most dominant frequency characteristics of a reception gain in a user's desired frequency band" among all the spread codes used for obtaining the processing gain of data.

In addition, the "most dominant frequency" denotes a frequency band where the receiver obtains the largest reception gain in case of transmission of data in a specific frequency band.

In the following description, Walsh codes are used as an example of spread codes for the frequency selective baseband transmission scheme.

The Walsh codes are constructed with 64 bits and classified into 64 types including W0, W1, W2, . . . , and W63. An XOR operation between the Walsh codes leads to a combination of 0 and 1, and average thereof becomes 0. In addition, the XOR operation between the same Walsh codes leads to all components of 1, so that a data hidden in a spread code can be recovered. Therefore, the Walsh codes are orthogonal spread codes which can be used to identify transmitting channels. In addition, the different Walsh codes have no correlation, but independency.

"Diversity" denotes a degree of diversification of receiving paths for signals in communication. The diversity is used to reduce fading in a mobile communication system. The diversity is used by taking into consideration the fact that a probability that levels of a plurality of independent sample signals are simultaneously decreased down to a specific level is lower than a probability that a level of a single signal is decreased down to the specific level. Due to use of the diversity, signals can be received through spatially and temporally separated signal transmission paths, so that two receiving signals can be compared to obtain a difference thereof or only the suitable signal can be extracted to reduce influence of the fading. That is, due to reception of all the diversities, the signal having the best characteristics among a large number of the receiving signals transmitted through two or more independent transmission paths can be used.

Therefore, in the present invention, the signals transmitted through various transmission paths can be separately received by using the reception of diversities, so that it is possible to improve reception characteristics and increase a signal-to-noise ratio (SNR), thereby obtaining a diversity gain.

As an embodiment of the present invention, a frequency modulation/demodulation apparatus used for a frequency selective baseband communication system and, particularly, a frequency selective baseband communication system adapted to human-body communication and a transmitting/receiving apparatus using the same will be described.

FIG. 1(a) is a graph illustrating frequency-varying amplitude response characteristics of a human body according to the present invention, and FIG. 1(b) is a illustrating a relationship among a frequency selective baseband, a frequency-varying internal-human-body transmission signal power, and an external-human-body noise power for human-body communication.

Referring to the amplitude response characteristics 10 of the human body shown in (a) of FIG. 1, since a human-body channel has substantially no Doppler effect, the amplitude response is very slowing changed and has a frequency selective characteristic according to delay spreading.

In addition, as shown in (b) of FIG. 1, in a frequency band of DC to 40 MHz used for human-body communication, an internal-human-body transmitting signal power 11 is larger than an external-human-body radiating signal power 12. However, in a frequency band of 40 MHz or more, the external-human-body radiating signal power 12 is larger than the internal-human-body transmitting signal power 11.

In addition, referring to a noise power 13 obtained by averaging a sum of measured powers of interference signals induced from the measurements at various sites, in a frequency band of DC to 5 MHz, the noise power is larger than the signal power.

Therefore, in the present invention, by taking into consideration the characteristics of the human channel, the frequency band of DC to 5 MHz where the noise power around the human body is further concentrated in comparison with other frequency bands is avoided, and the limited frequency band where the internal-human-body transmitting signal power transmitted through the human body functioning as a waveguide is larger than the external-human-body radiating signal power is used.

For example, in case of using the 64 Walsh codes, the Walsh codes having a dominant frequency shift among the codes are divided into 4 Walsh code sub-groups so that a bandwidth of the Walsh code sub-group is larger than a coherent bandwidth (a bandwidth having a sufficiently small coherence between two frequencies), and the Walsh code sub-group using the largest frequency band is selected according to communication channel environment.

More specifically, the frequency band of 0 to 16 MHz is divided into 64 Walsh codes, and the 64 Walsh codes are used as the spread codes. The 64 divided Walsh codes are uniformly and sequentially distributed over the frequency band including the most dominant frequency fd.

Therefore, in the present invention, the 64 Walsh codes are divided into 4 spread code groups, and the spread code group using the largest frequency band is selected among the 4 spread code group to transmit data. Otherwise, independent spread code groups are selected to repeatedly transmit data.

Figure 2:
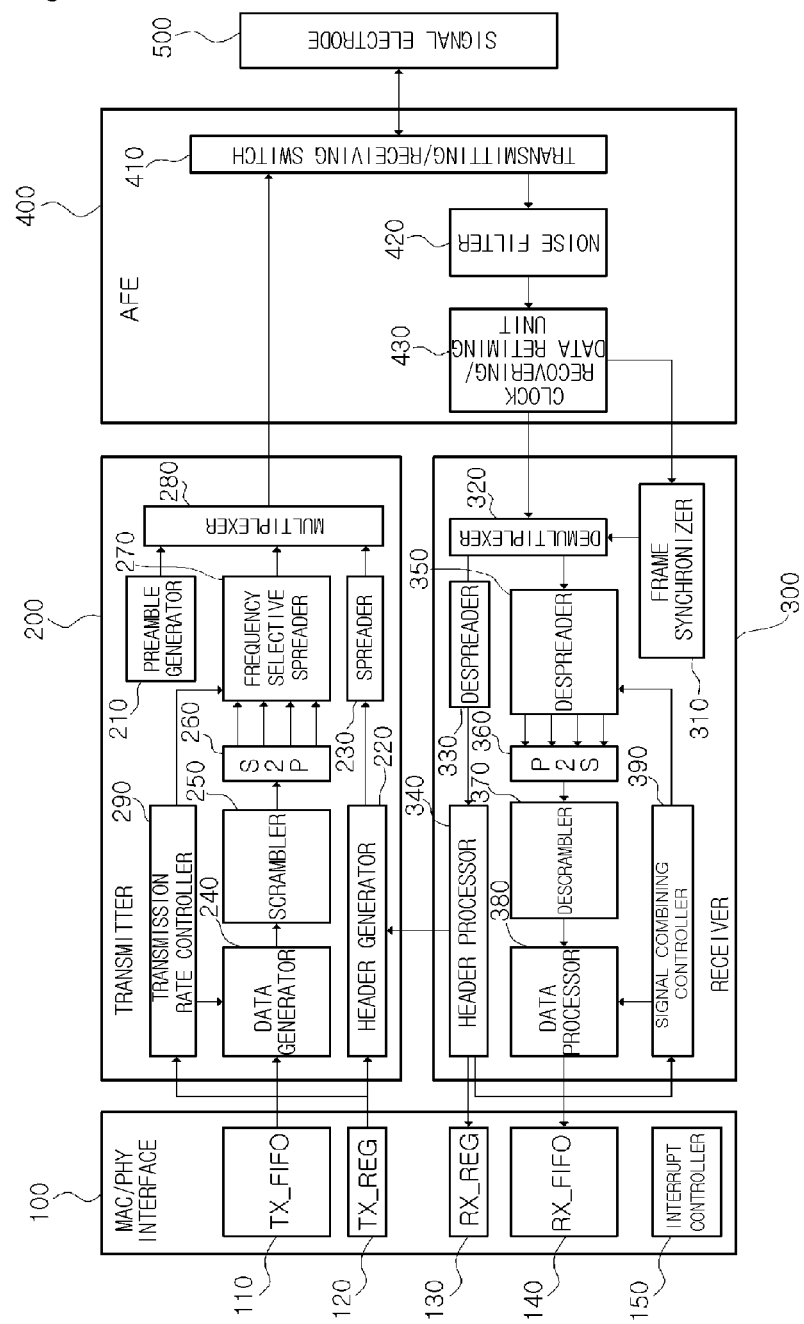
FIG. 2 is a view illustrating a configuration of a human-body communication system using a diversity gain and frequency selective baseband communication scheme according to an embodiment of the present invention.

FIG. 2 is a view illustrating a configuration of a human-body communication system using a diversity gain and frequency selective baseband communication scheme according to an embodiment of the present invention.

As shown in FIG. 2, the human-body communication system according to the present invention includes a MAC/PHY interface 100, a transmitter 200, a receiver 300, an AFE 400, and a signal electrode 500.

The MAC/PHY interface 100 is a block for serving an interface between an MAC and a physical-layer modem. The MAC/PHY interface 100 includes a TX_FIFO 110 for processing to-be-transmitted data received from an upper layer and a TX_REG 120 for processing information and headers for control of the transmitter 200.

In addition, MAC/PHY interface 100 includes an RX_REG 130 for uploading information and receiving headers for control of the receiver 300, an RX_FIFO 140 for storing the receiving data, and an interrupt controller 150 for generating interrupts to request for the to-be-transmitted date and notify the upper layer of completion of data recovery.

The transmitter 200 of the physical-layer modem includes a preamble generator 210, a header generator 220, a spreader 230, a data generator 240, a scrambler 250, a serial-to-parallel converter (S2P) 260, a frequency selective spreader 270, a multiplexer 280, and a transmission rate controller 290.

Functions of the transmitter 200 having the aforementioned configuration are mainly classified into three functions of preamble generation of the preamble generator 210, header generation of the header generating unit (220, 230), and spread code generation of the frequency modulating unit (240, 250, 260, 270, 280, 290) for the to-be-transmitted data.

Firstly, the preamble generator 210 generates a preamble used to obtain frame synchronization in the receiving side. That is, a predetermined length of a preamble is generated by setting a value known to all users as an initial value.

The header generator 220 receives control information (a transmission rate, a modulation scheme, user IDs, a data length, repetitive transmission times, etc) of the to-be-transmitted data from the TX_REG 120 in order to generate the header. The received control information of the data is generated and outputted in a predetermined header format. The spreader 230 receives the header format and performs spreading by using the scheduled spread codes.

The frequency modulating unit includes a data generator 240, a scrambler 250, a serial-to-parallel converter (S2P) 260, a frequency selective spreader 270, and a transmission rate controller 290. The frequency modulating unit performs a function of spreading the data that is to be transmitted through the human-body communication by using the spread code having the most dominant frequency characteristics in a user-desired frequency band, that is, the frequency selective spread code.

More specifically, the transmission rate controller 290 firstly controls the data generator 240 and the frequency selective spreader 270 to select the spread code group for the repetitive transmission of data in order to adjust the transmission rate according to the communication channel environment.

The transmission rate controller 290 notifies the information on the repetitive transmission times to the data generator 240, and the data generator 240 repeatedly outputs the same data according to the repetitive transmission times. In addition, the transmission rate controller 290 controls the frequency selective spreader 270 to select the spread code groups corresponding to the predetermined repetitive transmission times.

For example, in a case where the frequency band is divided into four spread code groups, if the communication channel environment is good, 16 Walsh codes of the spread code group 3 (W48-W63) are controlled to be selected for one-time transmission, so that the maximum transmission rate can be obtained. If the communication channel environment is bad, the spread code groups 3, 2, and 1 excluding the spread code group 0 corresponding to the frequency band having the largest noise are controlled to be selected for three-times transmission of the same data, so that more stable communication can be performed at a reduced transmission rate, that is, ⅓ of the transmission rate.

Therefore, the transmission rate controller 290 selects spread code groups by using 2-bit frequency selection control bits fs1 and fs0. If the 2-bit frequency selection control bits fs1 and fs0 are 1 and 1, the spread code group 3 (W48-W63) is controlled to be selected. If the 2-bit frequency selection control bits fs1 and fs0 are 1 and 0, the spread code group 2 (W32-W47) is controlled to be selected. If the 2-bit frequency selection control bits fs1 and fs0 are 0 and 1, the spread code group 1 (W16-W31) is controlled to be selected.

The data generator 240 receives the data transmitted from the MAC/PHY interface 100 and outputs the data at a desired time. In addition, the data generator repeatedly outputs the same data according to the communication channel environment under the control of the transmission rate controller 290.

The scrambler 250 is initialized based on a predefined user ID to output orthogonal codes and performs an XOR operation on the orthogonal codes and the output of the data generator 240 to perform data scrambling.

The serial-to-parallel converter 260 receives the scrambled data and performs 4-bit serial-to-parallel conversion. As a result of the serial-to-parallel conversion, the used frequency band is reduced by ¼, so that a larger amount of data can be transmitted in the same frequency band or a high quality of data can be transmitted by using a higher spread code gain in the same frequency band.

The frequency selective spreader 270 receives 4-bit outputs of the serial-to-parallel converter 260 in a parallel manner and outputs frequency selective spread codes.

In a case where the maximum transmission rate communication is not available due to bad communication channel environment, the frequency selective spreader 270 reduces the data transmission rate by using the selection control bit information transmitted from the transmission rate controller 290. Next, the frequency selective spreader selects the spread code groups constituting the independent channels by using the selection control bit information and outputs the spread codes.

The multiplexer 280 multiplexes the preamble generated by the preamble generator 210, the header generated by the header generator 220 and subject to the spreading in the spreader 230, and the data subject to the frequency selective spreading in the frequency selective spreader 270 in accordance with a frame configuration and outputs a digital signal.

Accordingly, due to the frequency selective spreader 270 according to the present invention, the selective baseband transmission using a desired frequency band can be obtained. In addition, the 1-bit output of the multiplexer 280 is inputted to the signal electrode 500 through the transmitting/receiving switch 410 without processes of an analog converter, an intermediate frequency converter, or other separate analog transmitting units, so that the digital signal can be directly transmitted through an inner portion of the human body.

In the human-body communication system, the receiver 300 includes a frame synchronizer 310, a header processor 340, a de-spreader 330, a data processor 380, a de-scrambler 370, a parallel-to-serial converter (P2S) 360, a frequency selective de-spreader 350, a de-multiplexer 320, and a signal combining controller 390.

Functions of the receiver 300 having the aforementioned configuration are mainly classified into three functions of frame synchronization acquisition, header processing, and data combining.

Referring to operations of the receiver 300, a receiving signal input through the signal electrode 500 is transferred through a transmitting/receiving switch 410 to a noise filter 420 for removing signals and noise in an undesired band. After that, the signal is inputted to the clock recovering/data retiming unit 430, so that a receiving clock and data for recovering a frequency and timing offset of the receiving data are outputted. The receiving clock and data output from the clock recovering/data retiming unit 430 are inputted to the frame synchronizer 310.

Firstly, the frame synchronizer 310 acquires a start time of a frame by using the preamble among the output of the clock recovering/data retiming unit 430 to perform frame synchronization and transfers the result thereof to the de-multiplexer 320.

The de-multiplexer 320 separates header and data parts from the data output from the clock recovering/data retiming unit 430 according to the frame synchronization of the frame synchronizer 310 and outputs the separated header and data parts.

Next, the de-spreader 330 and the header processor 340 extracts control information of the receiving data from the header part transferred from de-multiplexer 320 and transmits the information to the MAC/PHY interface 100.

The signal combining controller 390 acquires the repetitive transmission times set by the transmission rate controller 290 of the transmitter 200 and information on spread code group selection corresponding to the repetitive transmission times from the header of the receiving data and controls the frequency selective de-spreader 350 and the data processor 380 based on the acquired information.

For example, in a case where, due to good communication channel environment, the transmission rate controller 290 of the transmitter 200 is controlled to set the repetitive transmission times to 1 and select the spread code group 3, the signal combining controller 390 controls the frequency selective de-spreader 350 to de-spread the data by using the spread code group 3 and the data processor 380 to immediately output the de-spreaded data.

In a case where, due to bad communication channel environment, the transmission rate controller 290 of the transmitter 200 is controlled to set the repetitive transmission times to 3 and select the spread code groups 3, 2, and 1, the signal combining controller 390 controls the frequency selective de-spreader 350 to de-spread the receiving data by sequentially using the spread code groups 3, 2, and 1 and the data processor 380 to hold the de-spreaded output data. Next, if all the data corresponding to the repetitive transmission times are de-spreaded by the frequency selective de-spreader 350, the signal combining controllers controls combining the held data.

The frequency selective de-spreader 350 calculates a correlation value of the data part among the output of the de-multiplexer 320 by using the frequency selective spread code in the spread code group selected by the transmission rate controller 290 of the transmitter 200 and, after that, outputs parallel data (for example, 4-bit parallel data) as an index value corresponding to the spread code having the largest correlation value.

More specially, the frequency selective de-spreader 350 receives the repetitive transmission times and the information on the spread code group selection corresponding to the repetitive transmission times from the signal combining controller 390 and de-spreads the receiving data by using the corresponding spread code group.

The parallel-to-serial converter (P2S) 360 converts 4-bit parallel data output from the frequency selective de-spreader 350 to a serial data and transfers the serial data to the de-scrambler 370.

For the security, the de-scrambler 370 de-scrambles the serial converted data by using orthogonal codes which are initialized with a predefined initial value between two to-be-communicated terminals.

The de-scrambled data is inputted to the data processor 380. The data processor 380 receives from the signal combining controller 390 the number of spread code groups used by the transmission rate controller 290 of the transmitter 200, that is, the information on the repetitive transmission times and combines the data de-scrambled by the received repetitive transmission times. The data processor outputs the combined data to the MAC/PHY interface 100.

In addition, the data processor 380 compares bits of the data de-scrambled by the repetitive transmission times and outputs a value of the most-frequently-output bit as the result of combining, so that error-occurring bits can be recovered.

FIG. 3 is a view illustrating a configuration of a spread code group using 64-bit Walsh codes according to an embodiment of the present invention.

In the present invention, 64 Walsh codes are used as spread codes, and the 64 Walsh codes are divided into groups by using a larger coherent bandwidth. For example, in case of 8 groups, 8 Walsh codes are included in each group, and in case of 4 groups, 16 Walsh codes are included in each group.

As shown in FIG. 3, the embodiment of the present invention is a case where the 64 Walsh codes are divided into 4 sub-groups. Each of the 4 spread code groups, that is, group 0 (W0-W15), group 1 (W16-W31), group 2 (W32-W47), and group 3 (W48-W63) includes 16 Walsh codes.

The 64 Walsh codes W0 to W63 are sequentially mapped into the divided frequency band having the most dominant frequency fd among the 64 divided band of the using frequency band.

For example, in a case where the spreading frequency band of the entire Walsh codes is assumed to be 16 MHz, an interval of the most dominant frequency fd of one Walsh code is 250 KHz (=16 MHz/64). Therefore, the most dominant frequencies fd of the Walsh codes W0, W1, W48, and W63 are mapped into 0 Hz, 250 KHz, 12 MHz, and 15.75 MHz, respectively.

Therefore, in the present invention, in case of good communication channel environment, the group 3 (W48-W63) is selected, and the Walsh code having the most dominant frequency fd in a frequency band of 12 MHz to 15.75 MHz over the entire 16 MHz band is used. In case of bad communication channel environment due to a strong noise source, the data transmission rate is adjusted to repeatedly transmits the same data through independent channels by using the 4 spread code group having a frequency interval of 4 MHz (=16 MHz/4, a frequency bandwidth allocated to one group) between neighboring groups which is larger than the coherent bandwidth. In the receiving side, the receiving signals of several channels are combined to recover the error-occurring bits, so that a diversity gain can be obtained.

In this case, since relatively large noise sources exist in a low frequency band near DC, the sub-group 0 (W0-W15) is preferably excluded.

FIG. 4 is a view illustrating an example of a result of error recovery obtained by combining a receiving signal received by a receiver 300 according to an embodiment of the present invention.

As shown in FIG. 4, since the spread code group GROUP-3, GROUP-2, and GROUP-1 constitute independent channels, error occurring positions thereof are different.

For example, referring to a result of comparison of the bits in the groups shown in FIG. 4, it can be seen that, the 5-th bit of the group GROUP-3, the 10-th bit of the group GROUP-2, and the 19-th bit of the group GROUP-1 are error-occurring bits. Therefore, when the bits of the groups are combined, a value of the most-frequently-output bit among the bits of the 3 groups is output as the result of combining.

In this manner, the error-occurring bits can be recovered by performing the combining. As a method of performing the combining, there may be used an equal gain combining scheme, a maximum ratio combining scheme in which weighting factors are allocated according to communication channel characteristics, or the like.

In a case where the equal gain combining is performed after the frequency selective spread codes according to the embodiment of the present invention are received, the performance can be increased by about 5 dB.

Figure 5:
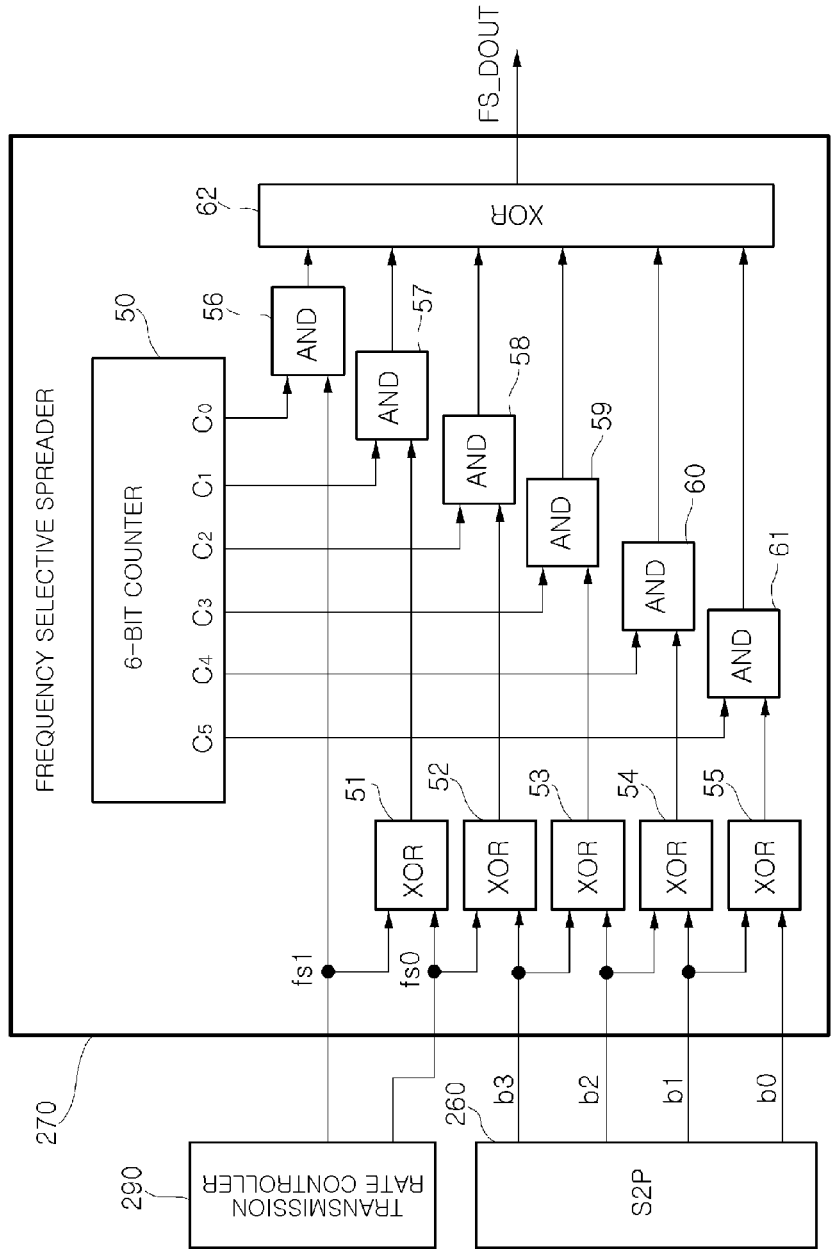
FIG. 5 is a detailed view illustrating a configuration of a frequency selective spreader according to an embodiment of the present invention.

FIG. 5 is a detailed view illustrating a configuration of a frequency selective spreader 270 according to an embodiment of the present invention.

The frequency selective spreader 270 according to the present invention uses 2N Walsh codes as the spread codes. In a case where $2^M$ (M<N) Walsh codes are selected and used among $2^N$ Walsh codes, the frequency selective spreader disposes (N−M) selection control bits of the transmission rate controller 290 to the most significant bit of the entire N input bits and adjusts an input value of (N−M) bits as a parameter input so as to select only the desired frequency band among the entire spreading frequency band. Otherwise, the frequency selective spreader selects three or more groups in order to obtain the diversity gain according to the communication channel environment, so that the same data is repeatedly transmitted.

In order to implement the aforementioned operation, the frequency selective spreader 270 includes an N-bit counter, (N−M)-bit frequency selection control bits, M-bit data input bits, (N−1) XOR logic circuits for gray indexing, N AND logic circuits having as inputs the output of the N-bit counter, the most significant bit of the frequency selection control bits and the (N−1) XOR logic circuits, and an XOR logic circuit for performing XOR operation on the outputs of the N AND logic circuits.

Hereinafter, the frequency selective spreader 270 will be described in detail.

It is assumed that, in case of N=6 and M=4, the frequency selective spreader 270 selects and uses 16 Walsh codes of the group 3 (W48-W63) among the four groups using the 64 Walsh codes shown in FIG. 3.

As shown in FIG. 5, the frequency selective spreader 270 includes a 6-bit counter 5. The frequency selective spreader has most significant 2-bit frequency selection control bits fs1 and fs0, least significant 4-bit data input bits b3, b2, b1, and b0 as inputs and 1-bit FS_DOUT as an output.

In addition, frequency selective spreader 270 includes: 5 XOR logic circuits 51, 52, 53, 54, and 55 for gray indexing; 6 AND logic circuits 56, 57, 58, 59, 60, and 61 having as inputs the output C5 to C0 of the 6-bit counter, the most significant bit fs1 of the frequency selection control bits and the 5 XOR logic circuits; and an XOR logic circuit 62 for performing XOR operation on the outputs of the 6 AND logic circuits.

In case of good communication channel environment, under the control of the transmission rate controller 290, the frequency selective spreader 270 fixes the frequency selection control bits fs1 and fs0 to 1 and 1 to select only the 16 Walsh codes of the group 3 (W48-W63), so that the maximum transmission rate can be obtained. On the contrary, in case of bad communication channel, under the control of the transmission rate controller 290, the frequency selective spreader 270 changes the frequency selection control bits fs1 and fs0 sequentially into 1 and 1, 1 and 0, and 0 and 1, so that the same data can be repeatedly transmitted through the groups 3, 2, and 1 excluding the group 0 having the strongest noise.

In this manner, although the transmission rate is reduced by ⅓ due to the repetitive transmission of data, more stable communication can be implemented.

The final output FS_DOUT of the frequency selective spreader 270 can be expressed by Equation 1.

$$FD\_DOUT = (fs1 \text{ and } C0) \text{xor} [(fs1 \text{xor} fs0) \text{ and } C1] \text{xor}$$
$$[(fs0 \text{xor} b3) \text{ and } C2] \text{xor} [(b3 \text{xor} b2) \text{ and } C3] \text{xor}$$
$$[(b2 \text{xor} b1) \text{ and } C4] \text{xor} [(b1 \text{xor} b0) \text{ and } C5] \quad \text{[Equation 1]}$$

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A frequency modulating apparatus, comprising:
   a transmission rate controller configured to control a data transmission rate and a number of repetitive transmission times according to a communication channel environment;
   a data generator controlled by the transmission rate controller and configured to output serial data repetitively based on the number of repetitive transmission times;
   a serial-to-parallel converter configured to convert the serial data outputted from the data generator into parallel data; and
   a frequency selective spreader configured to select and output a frequency selective spread code corresponding to the parallel data, under the control of the transmission rate controller,
   wherein the transmission rate controller is configured to control the frequency selective spreader to select one of a plurality of spread code groups obtained by dividing $2^N$ spread codes used for performing frequency spreading on the parallel data by $2^M$ spread codes, using N–M frequency selective control bits, each spread code group including $2^M$ spread codes, N being a natural number greater than 1, and M being a natural number smaller than N, and
   wherein the selected and outputted frequency selective spread code is selected from spread codes of the selected spread code group.

2. The frequency modulating apparatus of claim 1, further comprising a scrambler configured to scramble the serial data outputted from the data generator before the serial data is converted into the parallel data.

3. The frequency modulating apparatus of claim 1, wherein the transmission rate controller is configured to control the frequency selective spreader to perform the selecting of one of the plurality of spread code groups repetitively based on the number of repetitive transmission times.

4. The frequency modulating apparatus of claim 1, wherein the frequency selective spreader is configured to receive M-bit parallel data used for selecting the frequency selective spread codes for frequency spreading and the N–M frequency selective control bits used for selecting the one spread code group.

5. The frequency modulating apparatus of claim 4, wherein the frequency selective spreader is configured to select and output a different spread code group each time the serial data is output, and select and output one spread code from each spread code group.

6. The frequency modulating apparatus of claim 5, wherein the frequency selective spreader comprises:
   an N-bit counter configured to output N-bit input data;
   a plurality of first XOR arithmetic operators configured to perform a gray indexing operation on the N–M frequency selective control bits and the M-bit parallel data;
   a plurality of AND arithmetic operators configured to perform an AND arithmetic operation on the N-bit input data, the N–M frequency selective control bits, and outputs of the plurality of first XOR arithmetic operators; and
   a second XOR arithmetic operator configured to perform an XOR arithmetic operation on outputs of the plurality of AND arithmetic operators.

7. A frequency demodulating apparatus, comprising:
   a signal combining controller configured to control combining transmission data, which is transmitted from a transmitting side repetitively based on a number of repetitive transmission times according to a communication channel environment;
   a frequency selective de-spreader configured to, under the control of the signal combining controller, detect a frequency selective spread code used to generate the transmission data, repetitively based on the number of the repetitive transmission times and output M-bit parallel data corresponding to the transmission data;
   a parallel-to-serial converter configured to convert the M-bit parallel data output from the frequency selective de-spreader into serial data; and
   a data processor configured to, under the control of the signal combining controller, receive the serial data repetitively based on the number of repetitive transmission times and recover error-occurring bits,
   wherein the frequency selective de-spreader is configured to detect, from the transmission data, one of a plurality of spread code groups obtained by dividing $2^N$ spread codes used for frequency spreading by $2^M$ spread codes, detect the frequency selective spread code by selecting one frequency selective spread code from $2^M$ spread codes constituting the detected spread code group, and output an index value corresponding to the selected one spread code as the M-bit parallel data, N being a natural number greater than 1, and M being a natural number smaller than N.

8. The frequency demodulating apparatus of claim 7, further comprising a de-scrambler configured to de-scramble the serial data before recovering the error-occurring bits.

9. The frequency demodulating apparatus of claim 7, wherein the selected one spread code is a spread code corresponding to a highest correlation value obtained by comparing correlation values of the $2^M$ spread codes.

10. The frequency demodulating apparatus of claim 7, wherein the data processor is configured to, under the control of the signal combining controller, obtain a diversity gain by correcting the error-occurring bits with respect to the serial data, repetitively input based on the number of repetitive transmission times, using an equal gain combining scheme or using a maximum ratio combining scheme in which weighting factors are allocated according to communication channel characteristics.

11. A transmitting apparatus, comprising:
   a preamble/header generating unit configured to generate a preamble for frame synchronization and a header having control information for to-be-transmitted data;
   a frequency modulating unit configured to select spread code groups to be used a number of repetitive transmission times, according to a communication channel environment, among a plurality of spread code groups obtained by dividing $2^N$ spread codes used for frequency spreading by $2^M$ spread codes, and select one spread code among $2^M$ spread codes in each of the selected spread code groups, N being a natural number greater than 1, and M being a natural number smaller than N; and
   a multiplexing unit configured to multiplex the preamble, the header, and an output of the frequency modulating unit into a digital signal, wherein the frequency modulating unit comprises:
- a transmission rate controller configured to control a transmission rate of the to-be-transmitted data and the number of repetitive transmission times according to the communication channel environment;
- a data generator configured to output serial data repetitively based on the number of repetitive transmission times, under the control of the transmission rate controller;
- a serial-to-parallel converter configured to convert the serial data outputted from the data generator into M-bit parallel data and
- a frequency selective spreader configured to provide the plurality of spread code groups, select one of the plurality of spread code groups repetitively based on the number of repetitive transmission times using N–M frequency selective control bits, and select one spread code among the $2^M$ spread codes in each of the selected spread code groups using the M-bit parallel data.

12. The transmitting apparatus of claim 11, wherein the preamble/header generating unit comprises:
- a header generator configured to generate a header in a predetermined header format using the control information for the to-be-transmitted data;
- a header processor having a spreader configured to spread the header; and
- a preamble generator configured to generate a predetermined length of preamble using an initial value set in order to acquire the frame synchronization.

13. The transmitting apparatus of claimer 11, wherein the frequency modulating unit further comprises a scrambler configured to scramble the serial data outputted from the data generator before the serial data is converted into the M-bit parallel data.

14. A receiving apparatus, comprising:
- a frame synchronizer configured to detect a preamble of transmission data repeatedly transmitted using a frequency selective spread code and acquire a frame start time;
- a de-multiplexer configured to separate a header and data parts of the transmission data using the frame start time;
- a header processor configured to de-spread the separated header to recover control information of the transmission data;
- a frequency demodulating unit configured to select spread code groups, determined to have been used for modulation of the transmission data, among a plurality of spread code groups obtained by dividing $2^N$ spread codes by $2^M$ spread codes using information including a number of repetitive transmission times detected from the control information of the transmission data, and detect one spread code among $2^M$ spread codes included in each of the selected spread code groups, N being a natural number greater than 1, and M being a natural number smaller than N.

15. The receiving apparatus of claim 14, further comprising an analog processor configured to perform noise removing, clock recovering, and data retiming with respect to the transmission data before the frame synchronizer acquires the frame start time.

16. The receiving apparatus of claim 15, wherein the frequency demodulating unit comprises:
- a signal combining controller configured to control combining of the transmission data repetitively transmitted based on the number of repetitive transmission times;
- a frequency selective de-spreader configured to detect frequency selective spread codes from the transmission data repetitively transmitted based on the number of repetitive transmission times, under the control of the signal combining controller, and output M-bit parallel data;
- a parallel-to-serial converter configured to convert the M-bit parallel data outputted from the frequency selective de-spreader into serial data; and
- a data processor configured to receive the serial data repetitively based on the number of repetitive transmission times under the control of the signal combining controller and recover error-occurring bits,
- wherein the frequency selective de-spreader is configured to detect the selected spread code groups from the plurality of spread code groups, detect one spread code from $2^M$ spread codes constituting each of the selected spread code groups as the frequency selective spread codes, and output index values corresponding to the frequency selective spread codes as the M-bit parallel data.

17. The receiving apparatus of claim 16, wherein the frequency demodulating unit further comprises a de-scrambler configured to de-scramble the serial data before recovering the error-occurring bits.

* * * * *